United States Patent [19]

Borszyński

[11] Patent Number: 5,468,270
[45] Date of Patent: Nov. 21, 1995

[54] ASSEMBLY FOR WET CLEANING OF COMBUSTION GASES DERIVED FROM COMBUSTION PROCESSES, ESPECIALLY THE COMBUSTION OF COAL, COKE AND FUEL OIL

[76] Inventor: Wa ław Borszyński, ul. Olimpijska 11 m.40, 94-043 Łódź, Poland

[21] Appl. No.: 149,788

[22] Filed: Nov. 10, 1993

[30] Foreign Application Priority Data

Jul. 8, 1993 [PL] Poland ................................. 299617

[51] Int. Cl.$^6$ .................................................. B01D 47/00
[52] U.S. Cl. .......................... 55/228; 55/234; 55/237; 55/247; 55/256; 55/259; 55/282; 55/430; 96/52; 96/61
[58] Field of Search ......................... 55/228, 234, 237, 55/239, 235, 244, 256, 259, 247, 282, 320, 399, 430; 95/64, 71, 205, 211, 214, 223, 226; 96/52, 58, 61

[56] References Cited

U.S. PATENT DOCUMENTS

| | | | |
|---|---|---|---|
| 2,004,467 | 6/1935 | Hawley | 55/239 |
| 3,142,548 | 7/1964 | Krantz | 55/259 |
| 3,597,901 | 8/1971 | Heeney | 55/237 |
| 3,676,982 | 7/1972 | Price | 55/256 |
| 3,918,940 | 11/1975 | Westlake et al. | 55/239 |
| 4,235,609 | 11/1980 | Garigioli | 55/239 |
| 4,936,880 | 6/1990 | Sundberg | 55/259 |

FOREIGN PATENT DOCUMENTS

| | | | |
|---|---|---|---|
| 3712007 | 10/1988 | Germany | 55/256 |
| 0352012 | 8/1937 | Italy | 55/234 |
| 0464821 | 7/1951 | Italy | 55/234 |
| 140138 | 11/1987 | Poland . | |
| 143692 | 5/1988 | Poland . | |
| 161610 | 9/1991 | Poland . | |
| 0583811 | 12/1977 | U.S.S.R. | 55/256 |
| 0683790 | 9/1979 | U.S.S.R. | 55/244 |
| 0889088 | 12/1981 | U.S.S.R. | 55/235 |
| 0899094 | 1/1982 | U.S.S.R. | 55/256 |
| 0965482 | 10/1982 | U.S.S.R. | 55/239 |
| 1011185 | 4/1983 | U.S.S.R. | 55/237 |
| 1331540 | 8/1987 | U.S.S.R. | 55/256 |

*Primary Examiner*—C. Scott Bushey
*Attorney, Agent, or Firm*—Beveridge, DeGrandi, Weilacher & Young

[57] ABSTRACT

An assembly for wet cleaning combustion gases includes at least one dust extracting device and at least one dust absorbing device. The main vessel of the dust extracting device includes a bottom having a ridge roof structure. An inlet is provided for introducing combustion gases into the main vessel, and an outlet is provided for extracting at least partially cleaned combustion gases from the main vessel. A filter is located between the inlet and outlet. First and second auxiliary vessels are arranged with respect to the main vessel so as to form a Z-shape, when viewed from above. Sediment tanks located in the bottom of the auxiliary vessels receive sediment introduced therein from conveyors provided in the low portions of the main vessel. Waste fluid is discharged from the sediment tanks into the auxiliary vessels. The assembly also includes a dust absorbing device. This device includes a vessel, an inlet connected to the outlet of the dust extracting device, a duct for outputting cleaned flue gases, and a filter.

28 Claims, 6 Drawing Sheets

ASSEMBLY FOR WET CLEANING OF COMBUSTION GASES DERIVED FROM COMBUSTION PROCESSES, ESPECIALLY THE COMBUSTION OF COAL, COKE AND FUEL OIL

BACKGROUND OF THE INVENTION

The subject of the invention is related to an assembly for wet cleaning the combustion gases derived from combustion processes, especially the combustion of coal, coke and fuel oil. The assembly includes at least one device for dust extraction and at least one device for absorbing dust.

The gases produced in industrial processes from the combustion of coal, coke and fuel oil usually comprise many harmful components, mainly carbon monoxide, carbon dioxide, sulfur dioxide, nitrogen oxides and dusts, which components may result in environmental degradation. Due to such reasons, there is a strong need for various methods and devices for dust extraction and for cleaning gases produced during combustion of coal coke and rock oil.

From Polish Patent Specification PL No 140 138 there is known an assembly for cleaning flue gases, especially from coal and coke combustion processes, characterized by feeding the combustion gases from a combustion room or changer into a cyclone-type dust collector and absorbing column, which are connected via a channel for hydraulic transport of dust and slag to a sedimentary tank. The sedimentary tank is equipped with a draw changer, connected via a pump with the absorbing column and via a pump with the channel for hydraulic transport. This assembly additionally comprises a preliming bath tank which may be automatically switched off.

The assembly as described above substantially functions properly in small industrial combustion rooms which are coke-fired, but its action is worse in combustion processes which are fine coal-fired, and worst in the case of big industrial combustion rooms. Additionally, damage to the cyclone collector causes additional lowering of the effectiveness of the assembly.

From Polish Patent Specification PL No 161 610 there is known a cleaning assembly which is free from the above mentioned drawbacks. In this assembly, in the flue gas path between a furnace and a chimney there is disposed a dust extracting device and a dust absorbing device. The dust extracting device consists of two tanks connected at their tops, one tank having a bevelled bottom, being partially filled with inert or active fluid and having near its bottom a pipe for delivering flue gases. This pipe is submerged in fluid, and above the pipe, two nets are disposed horizontally and in a spaced relation, the nets being submerged in fluid. The space between the nets is filled with loose, fibrous mineral bulk material. In the bottom of the tank, in the smallest place of the bevelled bottom thereof, there is placed a helical conveyor, having an end connected with a bucket conveyor. The second tank constitutes a bleeding tank and includes a vertical baffle in the form of two nets disposed in a spaced relation, and the space between these nets is also filled with loose, fibrous mineral, bulk material. Each of these devices, arranged in series, constitute a tank partially filled with active fluid reacting with specific components of the flue gases.

Above the pipe delivering the flue gases, submerged in active fluid and near the bottom thereof, two nets are disposed, arranged horizontally and in a spaced relation. Also, submerged in active fluid, the space between the nets is filled with fibrous mineral bulk material. Horizontal nets in both devices are slightly convergent, and between the last device for absorbing dust and the chimney, a vacuum producing device is disposed. Although this assembly functions successfully, it has been stated that the cleaning process runs slowly, and in the case of big combustion chamber installations, it does not operate satisfactorily.

SUMMARY OF THE INVENTION

The aim of the invention is to provide an improved assembly for wet cleaning of flue gases, with the possibility of optionally setting-up the cleaning devices to obtain an optimal degree of cleaning while adapting the devices to the conditions of existing combustion chamber installations, not only for coal and fuel oil combustion processes, but for other combustion processes as well.

The aim has been achieved by means of a dust extracting device including a main tank, having a bottom in the form of a ridge roof structure, and preferably comprising at least two auxiliary tanks which are disposed such that it has a shape approximating the letter Z, when viewed from above. The Z-shape has a middle part constituting the cylindrical main tank equipped in the most deep parts thereof with two horizontal conveyors, preferably helical conveyors, for discharging sediment. The main tank cooperates with at least one device for discharging waste liquid, disposed in a sediment trap of the auxiliary tanks which are disposed in the arms of the Z-shape. In the outlet for the flue gases in the fluid there are disposed guides covering substantially the whole stream of the flue gas feed. Above the guides there is disposed a filtering means. The dust absorbing device constitutes a cylindrical tank, in which there is disposed a coaxial vertical pipe which constitutes a flue gas duct and ends with a cylindrical filtering means extending toward the bottom.

Preferably the guides have the step of blades, advantageously shaped in the form of a stationary rotor which is embedded on a vertical pipe, surrounding coaxially the flue gas outlet of the perforated end.

In another embodiment of the dust extracting device, the guides cooperate with the blades of a mixer, being driven advantageously by means of an electric motor.

In still another embodiment of the dust extracting device, the guide has a shape of an upwardly directed letter V.

Advantageously, in all of the dust extracting devices, the conveyor is equipped with transverse baffles, and in the operating space of the device for discharging waste fluid, the conveyor is equipped with a parallel baffle.

In a dust extracting device including a mixer, the mixer is surrounded with a filtering means comprising, alternately, ring shaped trough sections and a net having a wave-shaped cross-section.

In a preferred embodiment, the main tank is equipped with at least several electrodes, however one electrode is always disposed near the front of the conveyor, and the conveyor constitutes an electrode having the same sign as well.

In an alternative form of the dust extracting device having a guide in the shape of the letter V, the electrodes are disposed internally in the guide.

Advantageously, in all alternatives of the dust extracting device, the electrodes are powered with a voltage $U_1 \geq U_2 \geq 0$, $U_4 \geq U_3 \geq 0$ in a period of time $t_1 \geq t_2 \geq 0$, $t_4 \geq t_3 \geq 0$, the voltage potential of electrodes increasing successively, and the largest voltage potential is provided at the conveyor.

In one advantageous embodiment of the dust absorbing device, the filtering means is surrounded with a second filtering means. In a preferred alternative of the dust absorbing device, the filtering means constitutes a perforated pipe or advantageously a netted pipe, and the second filtering means coaxially surrounds the first filtering means. Advantageously, the second filtering means is fixed to a cap which sealingly surrounds the pipe. The second filtering means is equipped with a duct that delivers a liquid under pressure, wherein an inlet of the flue gases into the tank is above the level of the fluid and an outlet of the cleaned flue gases is in the side of the tank, and the tank has a conical bottom which ends with a waste liquid outlet.

In another preferred alternative of the dust absorbing device, the filtering means is fixed to bottom guiding elements, preferably inclined at an obtuse angle in relation to the filter axis, especially in the form of a pipe with the upper half of its jacket being removed, or of a pipe ending with a trough, which, together with the same type of upper guiding elements, are fixed to a vertical internal pipe, disposed coaxially in the vertical pipe constituting the flue gas inlet. Between the bottom and upper guiding elements, an also above the upper guiding elements there are disposed additional filtering means. The second filtering means is equipped with a duct delivering a liquid under pressure into the tank having a conical bottom, ending with a water liquid outlet. The outlet for cleaned flue gases is disposed above the liquid level, the guiding elements are disposed uniformly around the vertical pipe, preferably alternately to each other. The guiding elements are filled with the fluid which also fills up an internal pipe, such pipe ending at the level of the upper guiding elements. Additional filtering means are formed by means of radially situated troughs, with nets connecting these troughs.

Advantageously, the troughs have a cross-section in the shape of an expanded V letter and are inclined toward the bottom, in a direction opposite to the inclination of the guide elements. The troughs and connecting nets are circumferentially fixed to a supporting pipe embedded in the tank, such that between the pipe and the tank walls there is formed a ring-shaped circumferential channel.

Advantageously, the second filtering means is longer than the first filtering means, and preferably it ends at the level of the internal pipe.

In another form of the dust absorbing device, the filtering means constitutes a basket, preferably perforated, slotted or netlike, ending from above with a second filtering means having the form of a perforated, slotting cover. This filtering means is rotatably held in the bottom of the tank and in the pipe and connected drivingly with a motor, preferably an electric motor, wherein the flue gas inlet is situated above the level of the fluid and the cleaned flue gases outlet is in the pipe.

The assembly is intentionally constructed so that between the furnace installation and the chimney there is contemplated a series of devices, formed with at lest one dust extracting device and at least one dust absorbing device, being mutually connected as needed, and in the case when a larger amount of the devices is used, then a flue gas suction device and/or pumping device is connected between the devices.

Advantageously, the assembly is set up with a series of the devices, connected successively and alternately to each other in a defined sequence, depending on the user's needs, and the devices are filled up with inert or active fluid, wherein at least some elements of the applied devices have a modular structure.

Advantageously, the devices are equipped with vibration emitters for the filtering means.

Advantageously, the assembly may be constructed so that at least two dust extracting devices constitute a single constructional unit, or at least one dust extracting device and one dust absorbing device constitute a single constructional unit.

The advantage of the assembly according to the invention lies not only on the versatility of its application for various cleaning processes, simple construction and easy choice of particular devices, but primarily on the fact that the flue gases are cleaned completely. The devices comprised in the assembly may be freely chosen and connected one with the other, filled up with particular inert or active fluid, and the modular structure of some elements facilitates the mounting and proper choice of the device according to particular conditions.

In effect, there may be obtained as much as 100% cleaning of the flue gases, and merely warm air in the form of steam is discharged into the atmosphere.

BRIEF DESCRIPTION OF THE DRAWINGS

The subject of the invention will now be described, by way of example only, with reference to the accompanying drawings, in which.

DETAILED DESCRIPTION OF THE INVENTION

Figure 1:
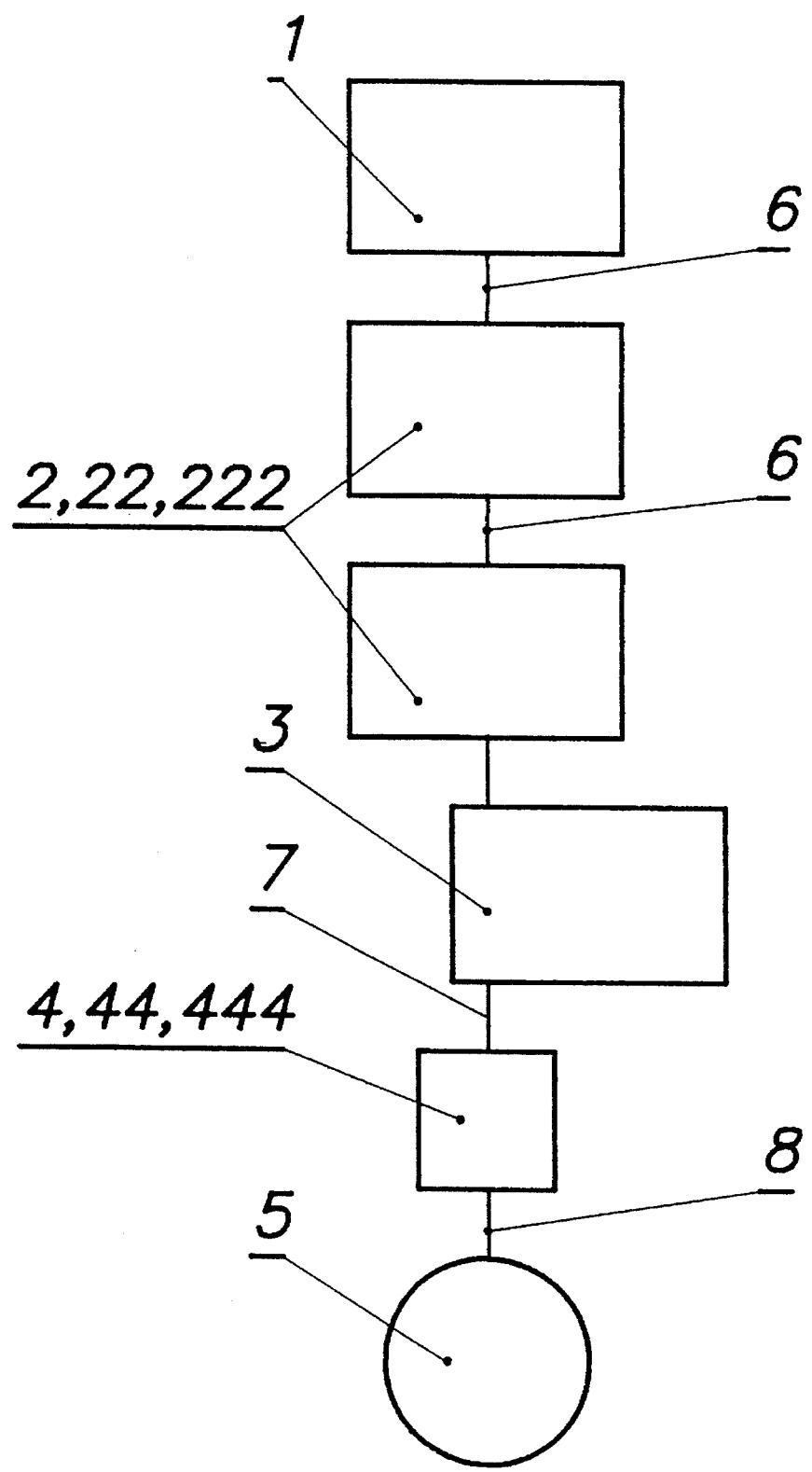
FIG. 1 shows schematically the assembly for wet cleaning of flue gases.

The assembly for wet cleaning of the flue gases developed during the combustion of hard coal, brown coal, coke and fuel oil, as shown in FIG. 1, is disposed between a furnace installation 1, and a chimney 5. The assembly is formed of successively connected flue gas cleaning devices.

As an example, the simplest assembly comprises one dust extracting assembly 2 or 22 or 222, filled with inert fluid, for example water including soap, and one dust absorbing assembly 4 or 44 or 444 filled with active fluid, for example fluids comprising known chemical compounds which bond the sulfur, nitrogen and carbon compounds, etc. in the flue gas. The assembly as above constitutes the minimum assembly which is able to function in small furnace installations 1, for example in domestic furnaces. There is advantageously employed a suction and force pump 3, to assist in flue gas flow in the path into chimney 5, but such pump is not necessary in every case.

It is understood that the amount of particular devices disposed in the path of the flue gases between the furnace installation 1 and the chimney 5 depends on the furnace size, and consequently the amount of flue gases and the desired degree of cleaning thereof.

The typical assembly illustrated in FIG. 1 includes two dust extracting devices, e.g., 2, 22, connected with the furnace installation 1 and with each other by means of a conduit 6. The last dust extracting device 22 is connected by means of a conduit 7 via the suction and force pump 3 with a dust absorbing assembly 4, which is connected via a duct 8 with the chimney 5.

The assembly according to the invention can be employed independent of the amount and size of the furnace installations in the form of one large assembly with a determined number of appropriate devices or particular assemblies, intended for particular furnace installations. However, the assembly should be disposed between the furnace installation and the chimney, and in that case, the chimney does not constitute a chimney in the conventional meaning, because in the embodiment according to the invention, from the chimney merely steam (including carbon dioxide) is discharged to the atmosphere. Thus, the discharged gaseous components are completely harmless to the environment.

As indicated in practice, the assembly according to the invention, depending on the kind of fuel used in the furnace installation, and consequently on the amount of dust and the amount and kind of particular devices used, enables the degree of flue gas cleaning to be as much as from 90 to 100%, and even in the case of 90% dust cleaning, the amount of harmful sulfur and nitrogen compounds discharged to the atmosphere is inappreciable.

As mentioned above, in the assembly according to the invention there can be employed various kinds of cleaning devices, which devices are described more precisely hereinafter.

Figure 2:
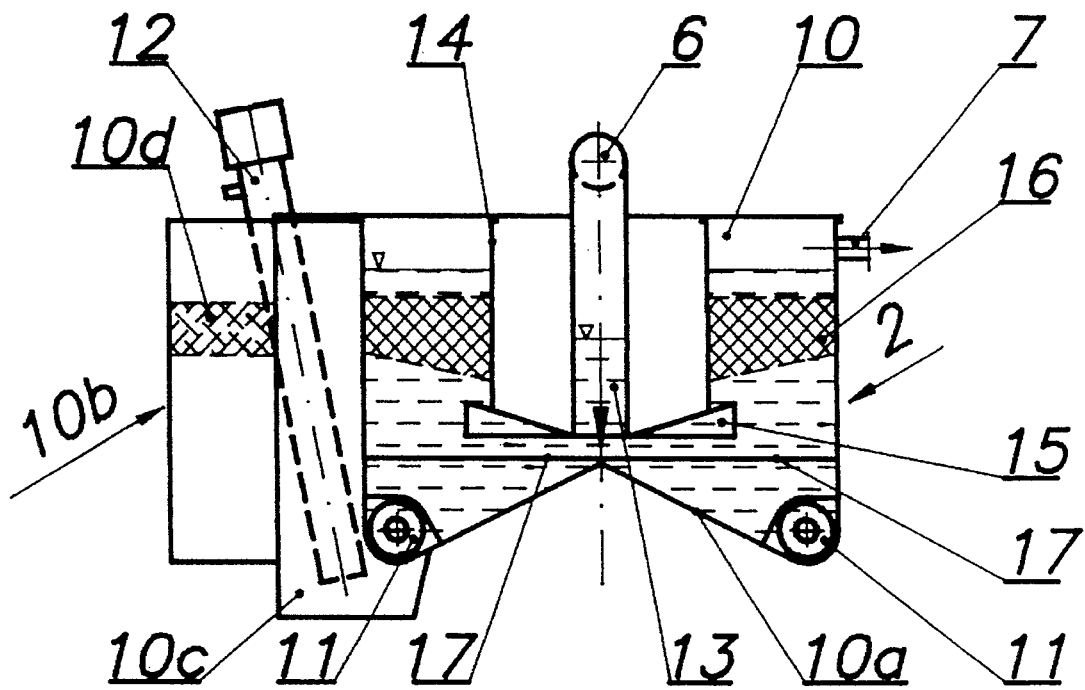
FIG. 2 shows the dust extracting assembly in longitudinal cross-section.
Figure 3:
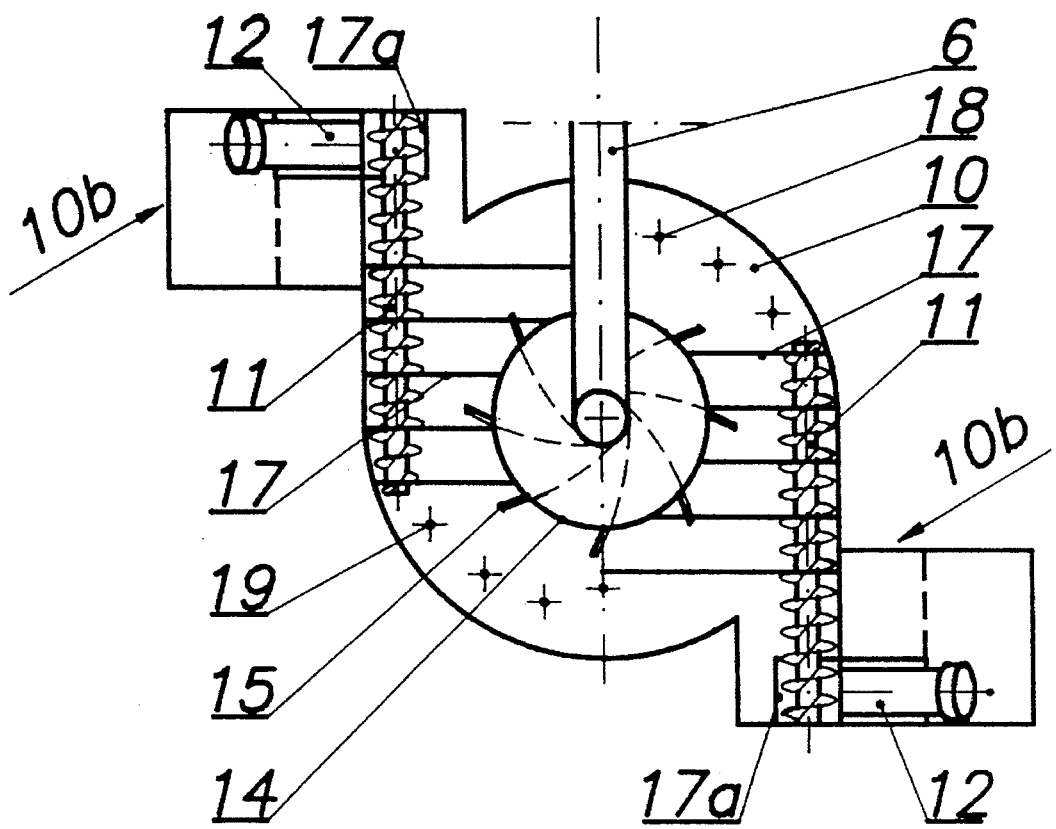
FIG. 3 shows the assembly of FIG. 2 in transverse cross-section.

The apparatus shown in FIGS. 2 and 3 constitutes the dust extracting device 2. The dust extracting device 2 includes a main vessel 10 having a bottom 10a in the form of ridge roof structure, and two auxiliary vessels 10b disposed oppositely in a space relation, the auxiliary vessels 10b having a sedimentation tank 10c. The auxiliary vessels 10b are mutually disposed so that, in a view from above, the auxiliary vessels 10b and the main vessel 10 have the shape like the letter Z. The middle part of the Z shape is made of the cylindrical main vessel 10, and the arms of the Z shape are made of the auxiliary vessels 10b with their sedimentation tanks 10c.

In the most deep parts of the bottom 10a of the main vessel 10, there are disposed conveyors 11, preferably helical conveyors, used to discharge sediments, formed of solid dust particles existing in the flue gases, into the filtering-off chambers 10c. In the chambers 10c there is disposed a device 12 for discharging waste fluid, for example a rotodynamic or piston pump, or a bucket conveyor. The auxiliary vessel 10b may include a filtering assembly 10d, disposed in the path of the waste fluid outlet, to perform an initial cleaning thereof.

In the symmetry axis of the main vessel 10 there is disposed a perforated tip 13 of the conduit 6. The flue gases from the furnace installation 1 or from the previous dust extracting device are admitted into the main vessel 10 through the tip 13. The conduit 6 is embedded in a cover of the vessel 10. The tip 13 is directed vertically downwardly and is surrounded with coaxial pipe 14. The pipe 14 ends with guides 15 in the form of blades constituting a stationary blade wheel.

Above the guides 15 there exists a known filtering means 16, for example, formed of mineral wool, disposed between two nets. As seen from FIG. 2, the filtering means 16 is disposed in the fluid. The filtering means 16 may be equipped with a vibration emitter (not shown), which enables discharge of stored sediments.

As shown in FIG. 3, at the height of the top of the bottom 10a of the main vessel 10, in the space of helical conveyors 11, there are disposed transverse baffles 17, vertical with respect to the helical-conveyor 11, extending from a side wall of the main vessel 10. These baffles 17 preclude whirling of the fluid in the space of the helical conveyor 11. Near the device 12 for discharging waste fluid, in the space of the helical conveyor 11, there is disposed a baffle 17a, parallel to the conveyor, which facilitates discharge of fluid and sediment. The main vessel 10 is filled up with inert fluid, and above the level thereof there is situated an outlet 7 for the flue gases being cleaned, which are exhausted, for example, to the next cleaning device. It is advantageous to furnish the main vessel 10 with known positive electrodes 18 and negative electrodes 19. Electrodes 18, 19 are disposed radially oppositely around the main vessel 10, and preferably two electrodes, namely one positive electrode 18 and one negative electrode 19, lie around the axis of the main vessel 10 on a smaller radius.

The electrodes 18, 19 are preferably equipped with vibration emitters (not shown) which cause particular vibrations, for example, vibrations having constant or variable amplitude. The vibrations may be periodically or preferably caused during the whole cleaning process.

The helical conveyors 11 are advantageously used as positive and negative electrodes.

Figure 4:
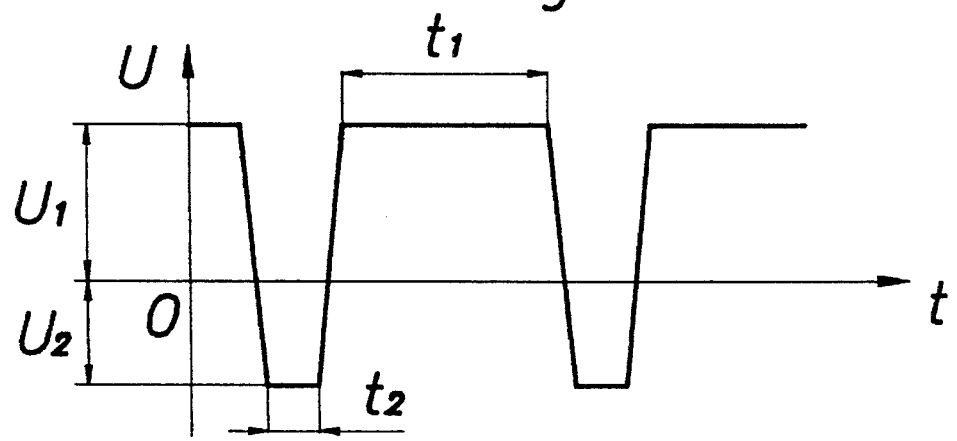
FIG. 4 shows the voltage course for the positive electrodes.
Figure 5:
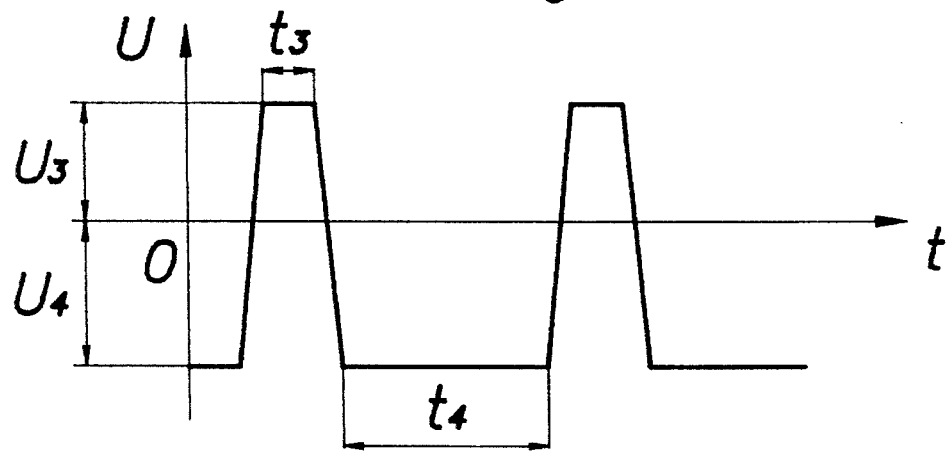
FIG. 5 shows the voltage course for the negative electrodes.

The exemplary working conditions of electrodes 11, 18, 19 are obtained, when the voltage applied to the positive electrodes 11, 18 has a course as shown in FIG. 4, where $U_1 \geq U_2 \geq 0$ and where $t_1 \geq t_2 \geq 0$, and for negative electrodes 11, 19, when the voltage applied has a course as shown in FIG. 5, where $U_4 \geq U_3 \geq 0$ and where $t_4 \geq t_3 \geq 0$. The dust extracting device 2 works in such manner that the flue gases from the furnace installation 1, for example from a hospital furnace room, are discharged via duct 6 to the tip 13, which is submerged in inert fluid. The flue gases in the form of gaseous bubbles encounter the guides 15 in the form of blades which are set in a whirling motion. This causes mixing of the solid dust particles with the fluid in the main tank 10. Such process leads to the formation of smaller or bigger pellets, which fall down onto the ridge roof bottom 10a, and slide thereupon to be introduced into the operating space of the conveyors 11. Thereafter the pellets are discharged to filtering-off chambers 10c. The solid particles, i.e., sediments from filtering-off chambers 10c, are discharged to the sedimentation tank in a known manner, while the waste fluid is discharged via devices 12, for example, in the form of a bucket conveyor, to auxiliary vessels 10b. In these vessels, the waste fluid is filter through a filter pack 10d and discharged to a return cycle, for example.

The particles of gaseous compounds, as well as solid particles which, due to various reasons (for example, their chemical composition, incomplete wetting, specific gravity, the rate of flue gases stream flow etc.), have not precipitated onto the bottom 10a of the tank 10, drift along with the fluid upwardly, and encounter a filter means 16, where they are stopped partially or totally. A portion of the stopped dust particles fall down onto the bottom 10a of the main vessel 10, from where the particles are discharged in the aforementioned manner by means of helical conveyors 11, and the other part is stopped by the filter means 16, from where the particles are discharged in a known manner. The totally or initially cleaned flue gas emerging from the fluid is discharged from the space between liquid level and the cover of the main vessel 10 by means of the duct 7, which leads to a subsequent device having the same or different construction.

In the dust extracting device shown in FIGS. 2 and 3, an active fluid may be applied instead of an inert fluid. For example, known chemical compounds for absorbing, for example sulfur compounds, nitrogen compounds etc., can be included in the fluid, and then the device constitutes a dust absorbing device. Such device then acts in a double way; namely, initial cleaning and accurate cleaning, since part of solid dust particles are wetted and fall down onto the bottom 10a, and the remaining part bond due to chemical reactions between the fluid and the dust particles and also fall down onto the bottom 10a.

In order to improve the effectiveness of cleaning by means of active fluid, in the absorber 4 positive electrodes 18 and negative electrodes 19 are applied. These electrodes initially separate gaseous components from solid dust particles on the basis of their electrical affinity, i.e., the dust particles having the electric affinity "−" are deposited on the positive electrodes 18, and the dust particles with affinity "+" are deposited on the negative electrodes 19. Inert dust is deposited on both electrodes 18 and 19.

Advantageously, the electrodes 18, 19 vibrate by means of vibration emitters which cause particular vibration of the electrodes. Such vibrations promote not only comminution of extracted solid dust particles, but also oppose the deposition of the particles on the electrode surfaces.

Moreover, advantageously the last electrodes 18 or 19 from the side of the respective helical conveyors 11 have a voltage higher than the electrodes situated, according to FIG. 3, nearer to the vertical axis of main vessel 10.

This causes the intentional displacement of dust particles having electric affinity into the space of operation of the helical conveyors 11, which can also constitute electrodes, the voltage thereof being higher than the voltage of electrodes 18, 19.

Such means cause much rapid precipitation of solid dust particles and effective discharging of the particles from the active fluid so that the flue gas emerging at the outlet 7 is substantially cleaned.

Figure 6:
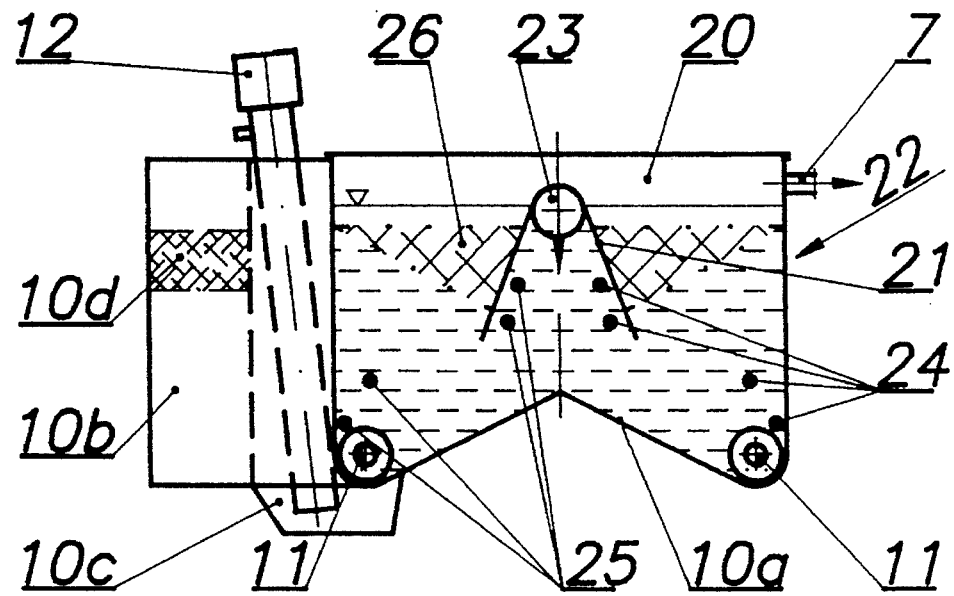
FIG. 6 shows another dust extracting device in longitudinal cross-section.

Another dust extracting device 22 is illustrated in FIG. 6, constructed in the same way as the device of FIGS. 2 and 3, and accordingly the parts thereof which correspond to elements 10a, 10b, 10c, 10d, 11, and 12, need not be described.

The difference lies in the introduction of the flue gases into the inert fluid in the main vessel 20 by means of a horizontal perforated stub 23, fixed substantially near the fluid level and surrounded with a guide 21 having the shape of a letter V, directed upwardly. The guide 21 is surrounded with a known filter means 26. The flue gases are introduced by means of the stub 23 directly from the furnace installation 1 or from another dust extracting device 2.

The guide 21 forces the flue gas flow downward. As in the previous dust extracting device 2 of FIGS. 2 and 3, part of the solid dust particles are deposited on the bottom 10a, and the other part is extracted by means of the filter element 26.

The device 22 also includes electrodes 24, 25 disposed in the main vessel 20, such that at least two positive electrodes 24 and two negative electrodes 25 are disposed in the guide 21. At least two electrodes 24 and 25 are disposed in the space of the helical conveyors 11, as well. The helical conveyors 11 preferably constitute electrodes as well.

The filtering means 26 as well as electrodes 24, 25 advantageously take particular vibrations produced by vibrating emitters (not shown). Further details of the construction and mode of operation of this embodiment are identical with the device 2 (4) of FIGS. 2 and 3.

In the case of applying an active fluid instead of an inert fluid, the device 22 constitutes a dust absorbing device.

Figure 7:
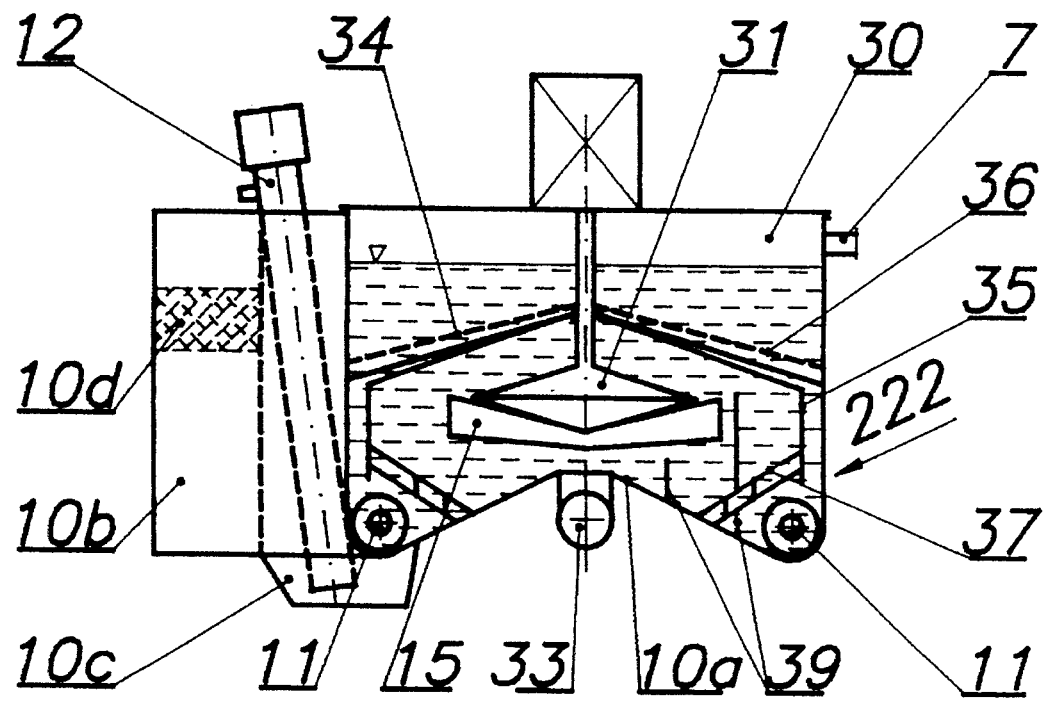
FIG. 7 shows the dust extracting assembly with a mixer.
Figure 9:
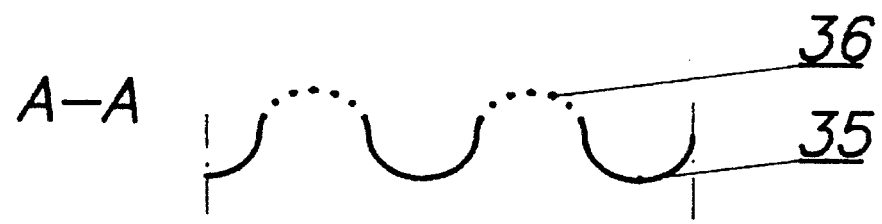
FIG. 9 shows the shape of the troughs and nets from FIG. 8.
Figure 8:
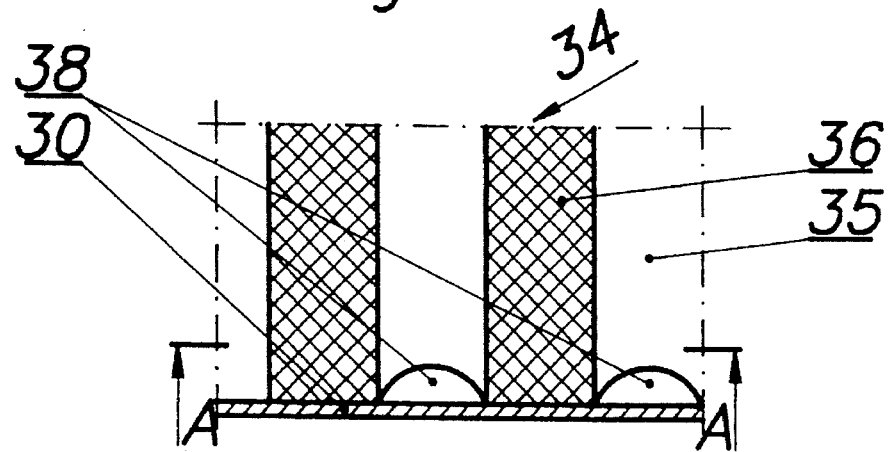
FIG. 8 shows the partial cross-section across troughs and filtering nets of the assembly from FIG. 7.

The dust extracting device 222, as shown in FIGS. 7, 8, 9, when applying an active fluid and electrodes instead of an inert fluid, can constitute a dust absorbing device, as well.

The device 222 is constructed similar to device 2 or 22, but in order to distinguish, the main vessel has reference numeral 30. However, it includes similar elements 10a, 10b, 10c, 10d, 11, 12, and 15. The flue gases initially cleaned or not are introduced by means of perforated tip 33 disposed transversely to the axis of main vessel 30 at the bottom 10a. Coaxially in the main vessel 30 there is disposed a mixer 31, rotating at a rate of up to 60 r.p.m. by means of an electric motor fixed on a cover of the main vessel 30. The mixer blades 31 cooperate with guides 15 disposed beneath the mixer 31 in a manner not shown precisely. Above the mixer blades 31 and coaxially therewith, on the whole transverse section, as shown precisely in FIGS. 8 and 9, there is disposed a filtering means 34, formed of troughs 35 and nets 36. The troughs 35 and nets 36 are shaped in the form of ring sections, having a wave shape in the side view, the front parts thereof being fixed to a side wall of the main vessel 30.

Alternate disposing of the troughs 35 and nets 36 enables the solid dust particles to be discharged and entrapped on the nets 36, which solid dust particles flow upon troughs 35, and via the formed channels 38 (FIG. 8), into the operation space of the helical conveyors 11.

As can be seen from FIG. 7, the troughs 35 and nets 36 are disposed on a supporting structure 37, which structure also precludes whirling of the fluid in the conveyor space under the action of the rotating mixer 31.

As can be seen from FIG. 7, in the bottom 10a, vertical electrodes 39 are disposed, situated circumferentially on the main vessel 30, preferably as shown in FIG. 2 and having the same purpose of operation. Both positive and negative electrodes 39 have various heights, the smallest being in the space beneath the guides 15, and the largest extending approximately above the upper edge of the guides 15.

In a manner similar to the previous examples, the electrodes 39 may be equipped with a vibrating emitter, and the helical conveyors 11 may constitute electrodes.

After cleaning, the flue gases are discharged via duct 7 to, for example, the chimney 5.

Figure 10:
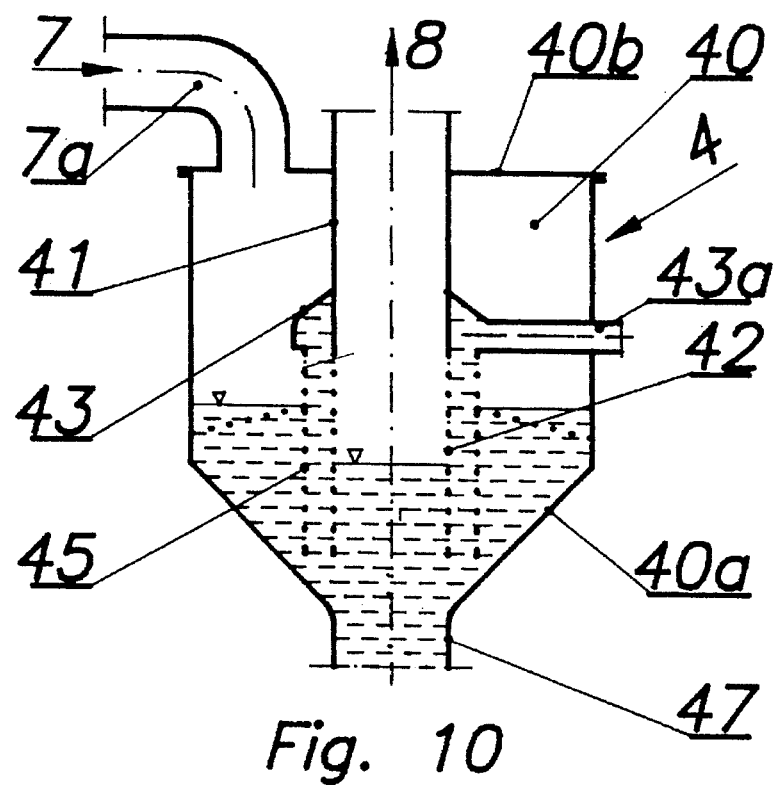
FIG. 10 shows the dust absorbing assembly in longitudinal cross-section.

In FIG. 10 there is illustrated a dust absorbing device 4, including active fluid. The device 4 includes a cylindrical vessel 40, having a conical end part 40a which has an outlet 47 for waste fluid. Initially cleaned flue gases are supplied by means of the stub 7, situated above the liquid level, for example, in the cover 40b.

Substantially in the axis of the vessel 40, there is disposed an outlet 8 for the cleaned flue gases, located in a vertical pipe 41, which ends approximately halfway down the vessel 40. One end of the pipe 41 is equipped with a cap 43 assuming the shape of a dome of a cone and having a horizontal conduit 43a for feeding the active fluid under a pressure of about 0.5–1 atm. The vertical pipe 41 ends with filter means 42, preferably in the form of a perforated or netlike pipe 42, and the cap 43 ends with a similar filter means 45, preferably in the form of a coaxial, outer netlike pipe 45. These pipes end near the outlet 47, advantageously with a spacing from the walls of the cone part 40a of the vessel 40. The outlet 47 serves for discharging the waste fluid together with bonded dust particles.

Figure 11:
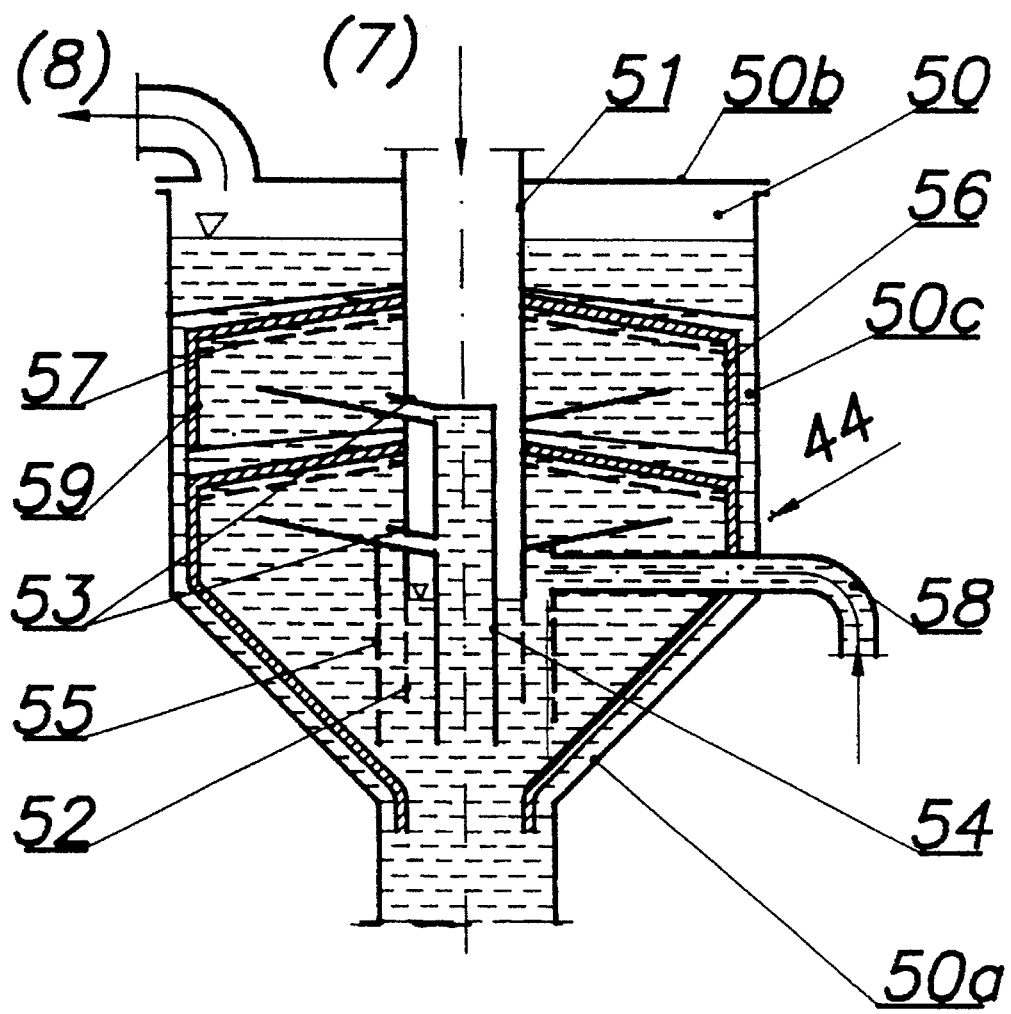
FIG. 11 shows another dust absorbing assembly in longitudinal cross-section.

In the FIG. 11 there is shown a dust discharging device 44 having a cylindrical vessel 50 with a conical part 50a, having an outlet for waste fluid. The flue gases are fed via duct 7 into a vertical pipe 51.

A pipe 54 is inserted into the pipe 51 from the side of conical part 50a. The upper end of pipe 54 is situated approximately near the middle region of the vessel 50, far above a stub 58. This stub 58 is provided for feeding the active fluid under pressure, preferably 0.5–1 atm. The upper end of the pipe 54 is closed and equipped with at least three guiding elements 53, disposed uniformly on the circumference of pipe 54. the guiding elements 53 are advantageously in the form of a pipe with its upper jacket half partially removed, or of a pipe ending with a trough. The guiding elements 53 are inclined at an obtuse angle to the axis of the pipe 51. preferably, they are inclined upward at an angle of about 5°–15°. As can be seen from FIG. 11, in the spacing from upper guiding elements 53, bottom guiding elements 53 are disposed which may have the same shape and the same relative location, although this is not necessary.

Alternating the location of the bottom and upper guiding elements 53 is intentional, since they are used to feed the fluid into the upper area of the vessel 50. The pipe 51 ends below the bottom guiding elements 53 with a filter means 52 in the form of a perforated, preferably netlike pipe located before the end of the pipe 54.

Coaxially with the netlike pipe 52 there is disposed an outer filtering means 55, in the form of netlike pipe as well, fixed to the bottom guiding elements 53 and preferably ending at the height of the opened end of the pipe 54. Just below bottom guiding elements 53, the conduit 58 is fixed to an initial area of the netlike pipe 55, for feeding the fluid to break up the bubbles of the flue gas.

Figure 12:
FIG. 12 shows the shape of the filtering troughs of the assembly from FIG. 11.

In the upper area of the vessel 50, above the upper and bottom guide elements 53 and radially on the whole circumference, troughs 56 are disposed alternately with nets 57. The troughs 56 have the shape of a broadened V in cross-section, as can be seen from FIG. 12. The nets 57 close the space between adjacent troughs 56. The troughs 56 enclose the operating area of the guide elements 53.

The troughs 56 and nets 57 are fixed to a supporting pipe 59, located in a spaced relation to the vessel 50 wall so that between them a circumferential channel 50c is formed which facilitates discharging the solid flue gas particles, entrapped by means of nets 57.

The arrangement of troughs 56 and nets 57 enables considerable extension of the flue gas bubble path in the fluid, and accordingly the extension of the flue gas solid particles wetting time and/or the extension of bonding time, namely chemical bonding of the particles with active fluid.

The cleaned flue gases are received by means of the tip 8 and discharged, for example, to the chimney 5.

Advantageously, the netlike pipes 52, 55 and sometimes the arrangement of troughs 56 and nets 57 are equipped with vibration emitters, as discussed with reference to the device 2, 22, 222.

Figure 13:
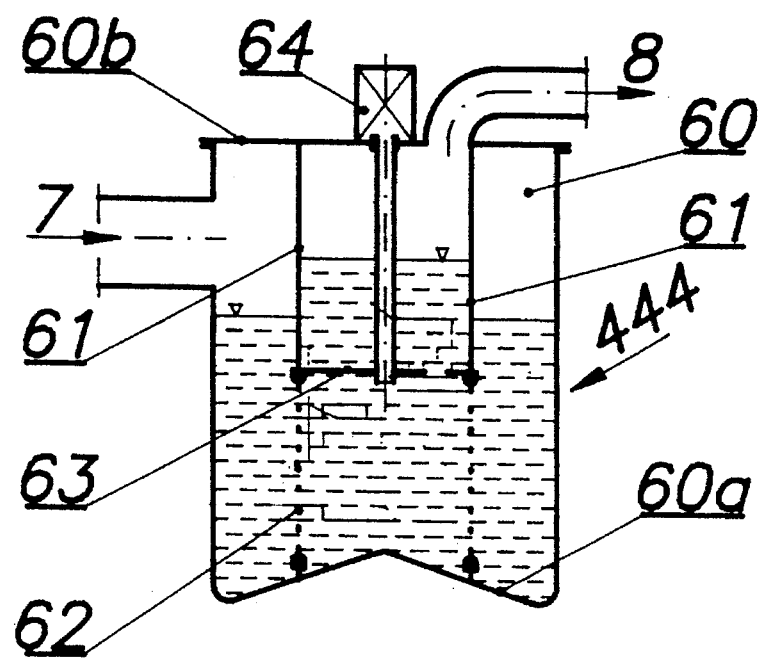
FIG. 13 shows the dust absorbing assembly, having a rotatable filtering bucket.

Another dust absorbing device 444 is shown in FIG. 13.

In a cylindrical vessel 60 having a bottom 60a, a vertical pipe 61, is disposed in the form of a ridge roof, fixed to a cover 60b. Beneath the pipe 61 there is located a rotatable bucket type filtering means 62. The bucket 62 has perforated, slotted or netlike walls which are bearingly supported on the bottom 60a and ends with a cover 63, situated bearingly within the pipe 61. The cover 63 is perforated or slotted and is connected drivingly with a motor 64, preferably an electric motor, which is placed on the cover 60b of the vessel 60. The cover 63 together with the bucket 62 is rotated at a rate up to 80 r.p.m., which enables accurate mixing of the solid and gaseous particles with active fluid and their chemical bonding.

The flue gases are fed by means of a conduit above the fluid level and are discharged by means of a vertical pipe 61, connected with the duct 8, and from there, for example, to the chimney 5.

It is understood, that discharging of waste fluid with solid dust or developed chemical compound molecules takes place into particular devices or preferably into a single common device (not shown), which device separates dusts or developed chemical compounds from the fluid. The fluid, indirectly or after further and indispensable known cleaning or replenishment with components in order to obtain the active fluid, is fed back to particular, selected devices or all devices in the assembly according to the invention.

As was mentioned above, the structure of the assembly according to the invention depends on the kind and on the amount of fuel used in furnace installation, the contents of the dust, as well as the inert or active fluid used, the bonding chemical molecules of the dust, and also on the number of devices 2, 22, 222, 4, 44, 444 being applied.

Advantageously, in particular devices there can be applied active fluids for successively absorbing the particular harmful chemical compounds from the flue gases. In other words, each harmful compound may be handled with a separate device.

The devices according to the invention, as described, can be applied in optional sequence and amount and beyond the devices 4, 44, 444, in which active fluid is intentionally used, inert fluid can be used therein, as well. The devices can clean the flue gases initially or finally. The terms used in the specification, namely "cylindrical", "pipe", "net", "netlike pipe" should be interpreted broadly, in relation to a plurality of bodies of revolution or various kinds of materials or constructions.

The term "flue gases" should be interpreted broadly as well, namely it should encompass all polluted gaseous agents, including air.

The assembly according to the invention does not illustrate the additional devices and assemblies necessary to correctly and ecologically operate, since they are known and can be successfully applied in the assembly and therefore, such illustration is not necessary to understand the invention.

The assembly according to the invention is not limited to cleaning the combustion gases derived from coal, coke and fuel oil combustion processes, and it can be effectively applied when cleaning flue gases or air derived from the chemical industry, cement plants, incinerating plants, etc., as well.

I claim:

1. An assembly for wet cleaning of combustion gases derived from combustion processes, said assembly being disposed between a furnace installation and a chimney, comprising:

at least one dust extracting device having a dust extracting fluid contained therein, said dust extracting device having an outlet, and at least one dust absorbing device connected to the outlet of the dust extracting device, wherein the dust absorbing device includes a vessel having an absorbing fluid contained therein, wherein combustion gases are introduced into said dust extracting fluid and are discharged therefrom through a filtering means disposed in said dust extracting fluid, wherein the dust extracting device includes a main vessel having a bottom which forms a ridge roof structure, a first auxiliary vessel and a second auxiliary vessel situated such that in a view from above, the main vessel and the first and second auxiliary vessels form a shape approximating a letter Z, wherein a middle part of the letter Z is made up of the main vessel, and the arms of the letter Z are made up of the first and second auxiliary vessels, wherein the main vessel is equipped with a first helical conveyor and a second helical conveyor provided in first and second low portions, respectively, of the ridge roof structure, said first and second conveyors provided for discharging sediments to first and second sediment tanks provided in the first and second auxiliary vessels, respectively, first and second devices for discharging waste fluid disposed in the first and second sediment tanks, respectively, wherein at an outlet for introducing a stream of combustion gases into the dust extracting fluid, a guide is provided which substantially encloses the stream of combustion gases, and wherein the filtering means is disposed above the guide, and wherein the vessel of said dust absorbing device includes a coaxially disposed duct for outputting cleaned flue gases, and a filtering means is provided in the dust absorbing device extending toward a bottom of the dust absorbing device with respect to the duct.

2. The assembly according to claim 1, wherein the guide includes a plurality of blades.

3. The assembly according to claim 2, wherein the guide blades are fixed on a pipe which coaxially encircles the outlet for introducing the stream of combustion gases into the dust extracting fluid, wherein said outlet includes a perforated tip.

4. The assembly according to claim 2, further including a mixer having mixer blades which cooperate with said guide blades, wherein said mixer is driven by means of an electric motor.

5. The assembly according to claim 1, wherein the guide has the shape of an inverted letter V.

6. The assembly according to claim 1, wherein the first and second conveyors are each equipped with transverse baffles.

7. The assembly according to claim 1, wherein the first and second conveyors discharge sediment into an operating space of the first and second devices for discharging waste fluid, respectively, and each of the first and second conveyors is equipped with a parallel baffle.

8. The assembly according to claim 4, wherein the mixer is encircled with the filtering means of the dust extracting device, wherein the filtering means of the dust extracting device is composed of alternately arranged radial trough sections and a net having a wave-shaped configuration.

9. The assembly according to claim 1, wherein the main vessel is equipped with electrodes, wherein one electrode is disposed near the first conveyor, and one electrode is disposed near the second conveyor, wherein the first and second conveyors also constitute an electrode having the same sign as the respective electrode located near the conveyor.

10. The assembly according to claim 9, wherein electrodes are disposed inside the guide.

11. The assembly according to claim 9, wherein a first set of electrodes associated with the first conveyor are powered with a voltage $U_1 \geq U_2 \geq 0$, $U_4 \geq U_3 \geq 0$ in a time duration $t_1 \geq t_2 \geq 0$, $t_4 \geq t_3 \geq 0$, wherein the electrode voltage potential increases successively, such that the largest voltage potential is provided at the first conveyor.

12. The assembly according to claim 1, wherein the filtering means of the dust absorbing device is encircled with a second filtering means.

13. The assembly according to claim 12, wherein the filtering means of the dust absorbing device includes a perforated pipe or a net-like pipe.

14. The assembly according to claim 12, wherein the second filtering means coaxially encircles the filtering means of the dust absorbing device.

15. The assembly according to claim 14, wherein the second filtering means is fixedly attached to a cap which tightly encircles said duct for outputting the cleaned flue gas, said cap being equipped with a conduit for feeding the absorbing fluid under pressure, and wherein the dust absorbing device further includes an inlet for introducing the combustion gases from the dust extracting device into the vessel of the dust absorbing device such that the combustion gases are introduced above the liquid level in the dust absorbing device.

16. The assembly according to claim 14, wherein the dust absorbing device includes a plurality of upper guide elements and a plurality of lower guide elements, wherein the second filtering means is fixed to the lower guide elements, wherein the lower guide elements are in the form of a pipe having an upper jacket half partially removed or in the form of a pipe which ends with a trough, wherein the upper guide elements are fixedly attached to an internal pipe, disposed concentrically in a pipe which constitutes the inlet of the combustion gases from the dust extracting device, wherein between the lower and the upper guide elements, and also above said upper guide elements, additional filtering means are disposed, wherein the second filtering means is equipped with a conduit for feeding the absorbing fluid under pressure into the vessel, wherein the bottom of the vessel is conical and the bottom terminates with an outlet for waste fluid, and wherein the duct for the cleaned flue gases is situated above the liquid level.

17. The assembly according to claim 16, wherein the upper and lower guide elements are disposed uniformly about the pipe which constitutes the inlet for the combustion gases, said upper and lower guide elements being located in contact with the absorbing fluid, said internal pipe having a top thereof located at a height of the upper guide elements, and wherein the additional filtering means is formed of radially disposed troughs and the nets connecting the troughs.

18. The assembly according to claim 17, wherein the radially disposed troughs have a transverse cross-section in the shape of a broadened letter V, wherein the radially disposed troughs are inclined downwardly and oppositely to an inclination of the upper and lower guide elements.

19. The assembly according to claim 18, wherein the radially disposed troughs and connecting nets are circumferentially attached to a supporting pipe and are embedded in said vessel such that between said supporting pipe and the vessel walls, a ring-shaped, circumferential channel is formed.

20. The assembly according to claim 14, wherein the second filtering means is longer than the filtering means of the dust absorbing device.

21. The assembly according to claim 1, wherein the filtering means of the dust absorbing device constitutes a bucket having a perforated, slotted or netlike construction, wherein the bucket is covered with a perforated or slotted cover.

22. The assembly according to claim 21, wherein said bucket and said cover are supported rotatably in the bottom of the vessel, wherein the bucket is drivingly connected with a motor to provide rotation of the bucket, wherein an inlet for the combustion gases into the dust absorbing device is disposed above the liquid level, and the duct for outputting the cleaned flue gases is disposed above the liquid level.

23. The assembly according to claim 1, wherein between said furnace installation and said chimney, at least two dust extracting devices and at least one dust absorbing device are connected together in series, and a suction or pumping device is provided to assist the combustion gas flow.

24. The assembly according to claim 23, wherein the dust extracting fluid is an inert fluid, and the dust absorbing fluid is an active fluid.

25. The assembly according to claim 1, wherein said filtering means of said dust extracting device includes a vibration emitter.

26. The assembly according to claim 23, wherein at least two of said dust extracting devices are constructed together so as to constitute one constructional unit.

27. The assembly according to claim 23, wherein at least one dust extracting device and at least one dust absorbing device are constructed together so as to constitute one constructional unit.

28. An assembly for wet cleaning combustion gases derived from combustion processes, comprising:

a dust extracting device including:
  a main vessel having a bottom which forms a ridge roof structure, wherein the main vessel has dust extracting fluid contained therein;
  an inlet for introducing combustion gases into the dust extracting fluid located in the main vessel;
  an outlet for removing at least partially cleaned combustion gases from the main vessel;
  a filtering means provided in the dust extracting fluid of the main vessel such that the combustion gases pass through the filtering means during travel from the inlet to the outlet;
  a first auxiliary vessel;
  a second auxiliary vessel, wherein the first auxiliary vessel and the second auxiliary vessel are situated such that in a view from above, the main vessel and the first and second auxiliary vessels form a shape approximating a letter Z, wherein a middle part of the letter Z is made up of the main vessel, and the arms of the letter Z are made up of the first and second auxiliary vessels;
  a first sediment tank provided at a bottom of the first auxiliary vessel;
  a second sediment tank provided at a bottom of the second auxiliary vessel;
  a first conveyor provided in a first low portion of the ridge roof structure, wherein the first conveyor is provided for discharging sediment to the first sediment tank;
  a second conveyor provided in a second low portion of the ridge roof structure, wherein the second conveyor is provided for discharging sediment to the second sediment tank;
  a first device for discharging waste fluid from the first sediment tank;
  a second device for discharging waste fluid from the second sediment tank; and
  guide means provided proximate the inlet and below the filtering means;

said assembly further including a dust absorbing device which includes:
  a vessel having an absorbing fluid contained therein;
  an inlet into the vessel connected to the outlet of the dust extracting device;
  a duct for outputting cleaned flue gases connected to the vessel; and
  filtering means provided in the vessel.

* * * * *